United States Patent [19]
Fedele, Sr.

[11] Patent Number: 5,617,621
[45] Date of Patent: Apr. 8, 1997

[54] WHEEL SEAL REMOVAL TOOL

[76] Inventor: Carman J. Fedele, Sr., 1 Main St., Tidioute, Pa. 16351

[21] Appl. No.: 519,813

[22] Filed: Aug. 25, 1995

[51] Int. Cl.$^6$ .................................................. B23P 19/02
[52] U.S. Cl. .............................................. 29/235; 29/267
[58] Field of Search ................................ 29/221.5, 235, 29/242, 244, 245, 267, 278, 270, 283

[56] References Cited

U.S. PATENT DOCUMENTS

| D. 135,426 | 4/1943 | Otto | 29/245 |
| 1,820,575 | 8/1931 | Mayhew | 29/245 |
| 2,118,159 | 5/1938 | Castner | 29/245 |
| 2,441,696 | 5/1948 | Feingold | 29/267 |
| 3,852,839 | 12/1974 | Blessing | 29/221.5 |
| 5,406,683 | 4/1995 | Arnold | 29/267 |

Primary Examiner—Robert C. Watson
Assistant Examiner—Thomas W. Lynch
Attorney, Agent, or Firm—John P. Halvonik

[57] ABSTRACT

A tool for removing seals from wheel hubs is shown and described. The tool comprises a handle or lever portion having an upstanding hook portion and a cross member in connection with the hook portion. The hook portion is perpendicular to the plane of the cross member and the bottom of the hook portion is about flush with the front edge of the cross member. The front of the tool is placed in the bore of the wheel hub and flush against the seal. The tapered ends of the cross member will be aligned against the seal and will hold the hook portion in place when the lever is pivoted.

2 Claims, 2 Drawing Sheets 5,617,621

WHEEL SEAL REMOVAL TOOL

FIELD AND BACKGROUND OF THE INVENTION

The invention relates to the field of tools and in particular to wheel seal removal tool having an upstanding hook portion. The invention is an improvement over such in that it has a tapered cross member which allows the cross member to fit better in bore of the wheel and to abut the wheel so as to align the hook portion of the tool with the seal of the wheel. The tapered portions of the cross member will help to keep the hook in connection with the seal as the tool is being used.

PRIOR ART

There are no known devices that are of the applicant's design having a cross member and upstanding hook that are used to remove wheel seals from autos, trucks and other vehicles. Moreover, there are no known tools with a cross member having a leading edge tapered at an angle to the rear edge of the cross member as the applicant's tool does.

SUMMARY OF THE INVENTION

A tool for removing seals from wheel hubs is shown and described. The tool comprising a handle or lever portion having a front end that is received in a wheel hub. The front of the tool comprises an upstanding hook portion and a cross member in connection with the hook portion. The hook portion is perpendicular to the plane of the cross member and the bottom of the hook portion is about flush with the front edge of the cross member. The front of the tool is placed in the bore of the wheel hub and flush against the seal. The tapered ends of the cross member will be aligned against the seal and will hold the hook portion in place when the lever is pivoted.

When in use, the user would secure the two tapered ends of the cross member within the bore of the wheel seal at two points opposite one another. The hook portion would fit behind the seal at a point above the cross member. The user would then press down on the handle and the hook portion should provide enough leverage in order to remove the wheel seal.

It is an object of the invention to provide a wheel seal removal tool having a hook and a cross member so that the hook can readily fit under a wheel seal when the cross member of the tool is aligned against the seal of the wheel.

Another object is to provide a wheel seal removal tool that can be easily secured within the wheel hub at two points in order to provide a secure support for the pivoting of the hook portion of the tool and to prevent the hook from disengaging when the tool pivots against the seal.

Another object is to provide a device for removing of the wheel seals that does not require heavy effort and that minimizes the risk of damage to the wheel.

Other objects of the invention will become known to those skilled in the art once the invention has been shown and described.

DESCRIPTION OF THE PREFERRED EMBODIMENT

Figure 1:
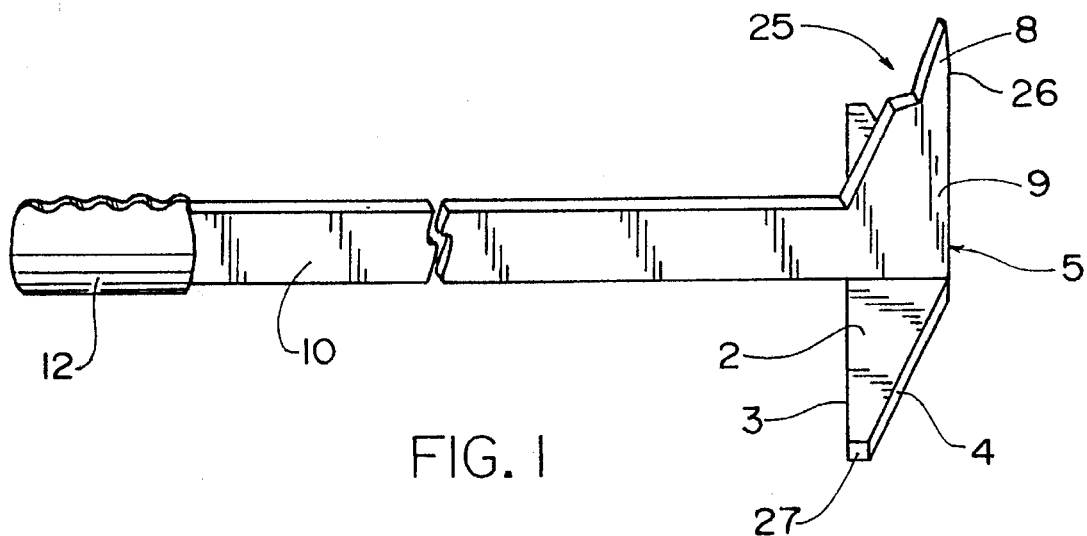
FIG. 1 Overall construction of the tool,
FIG. 2 a top view of the cross member.

The overall construction of the wheel seal removal tool is shown in FIG. 1. The wheel hubs of heavy vehicles, such as trucks, trailers, etc. have seals to protect the bearings and to retain lubricant. The tool described herein is designed to remove such seals without damage to the bearings.

There is a rigid handle 10 and has a hand grip portion 12 at one end of the handle. The other end has a hook portion 8 and 9 and cross member 3 in connection with the hook portion at a point near the bottom of this portion. See FIG. 1. The hook portion 8 should be behind all or most of the front face 5 of the cross member as can be seen in FIG. 1. This is to insure that when the cross member is placed against the wheel the hook portion will be able to hook behind the seal 22 that goes around the wheel and is inside the hub 20. The tap edge 26 of the hook portion may be tapered back some from the front face 5 of upraised portion 9. There may be a notch of right angle shape 25 at the rear of portion 9 in order to create the hook.

Figure 2:
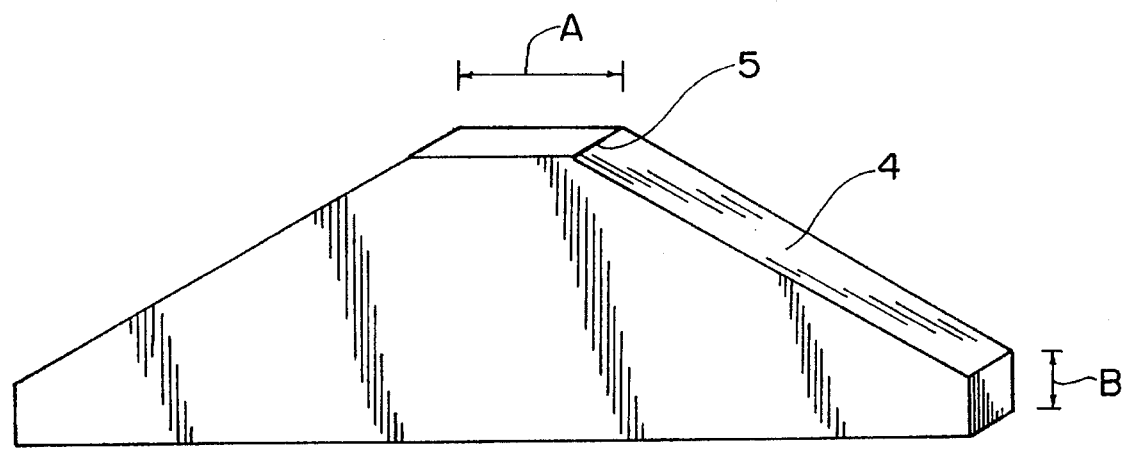

The leading edge of the cross member is shown as 4 and the rear edge is shown as 3. The rear or trailing edge should be about perpendicular to the center line of the handle as shown. The front face 5 is tapered back toward the rear edge at angle so that when these two edges meet they will form a somewhat narrow portion at the ends of the cross member. These end portions 27 are blunt, as opposed to being pointed, and may be about ⅜" in width as seen by arrow B in FIG. 2.

Figure 3:
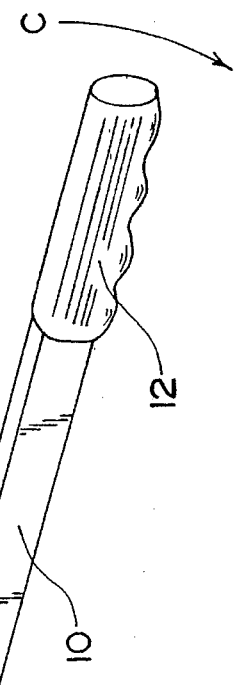
FIG. 3 shows the tool in use,
FIG. 4 side view of the tool in use.
Figure 3:
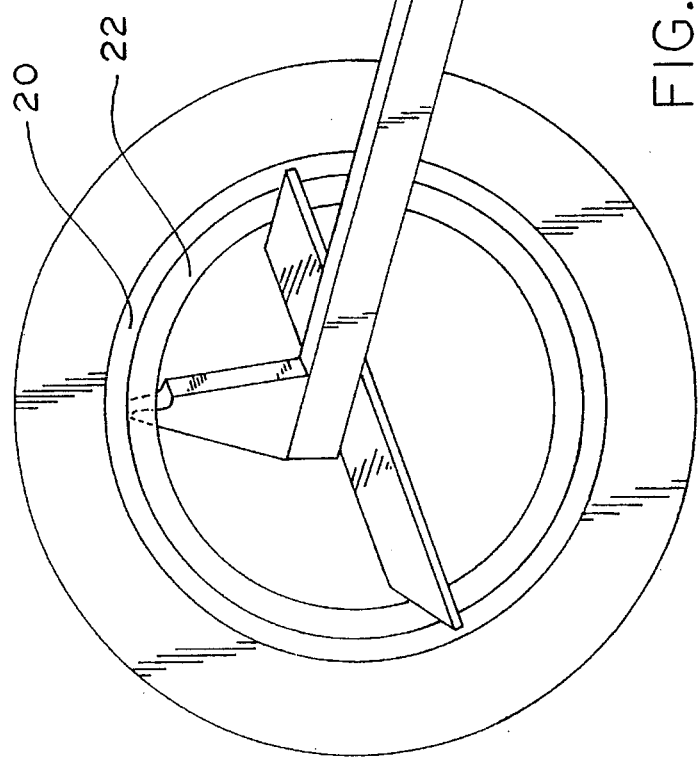

When in use, the user would align the two ends of the cross member against the seal 22 of the wheel hub 20 at two points opposite one another, see FIG. 3. This can be done by pressing on the handle so that it pushes the two ends of the cross member against the seal. The ends will probably not touch the hub but this is of no great consequence.

Figure 4:
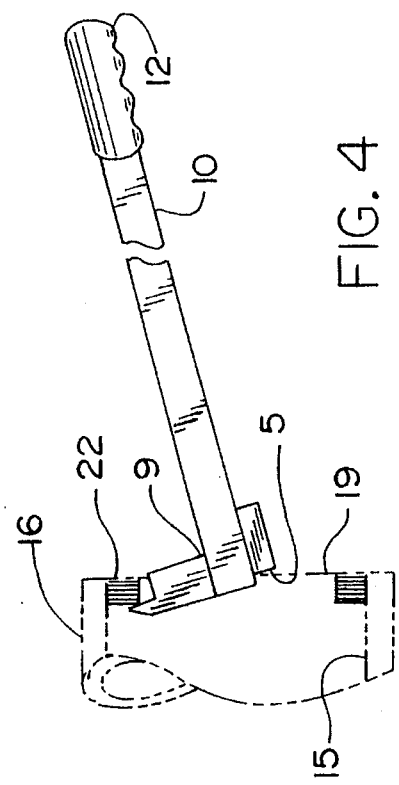

As seen in FIG. 4, the front face 5 of the tool 5 would then fit into the bore 15 of the wheel hub 16 and the hook portion 8 would then hook behind the seal 14 at a point above the cross member. The front edge 5 of the cross member will abut the rim 19 of the wheel hub. There is usually about ⅜" or more space behind the seal that the hook will fit into. The use of the tapered edges will help to align the hook behind the seal. The tapered edge will also help to keep the hook in position as the tool is being pivoted.

The tapered portion 4 of the front of the cross member allows the cross member (and the rest of the tool) to pivot against the hub and keeps the hook in connection with the seal. The user would then press down on the handle in the direction of arrow C and the support of the cross member should provide enough leverage in order to remove the wheel seal.

It is preferred that the hook, cross member and lever portion be made of metal. The handle may be of plastic or other materials that are found to be suitable. The hook and cross member may be made of separate units that are then attached one another by methods, such as, welding. Other rigid materials and methods of construction may be used without varying from the spirit of the invention.

It is preferred that the flat front of the cross member, that portion shown by arrow A, should be about 1" in width and that tapered ends shown by arrow B should be about ⅜" in width. The cross member may be about 1.5" in width at its widest point, that being near the middle part of the cross member. The dimensions of height and width may be seen in the top view—FIG. 2. The hook portion should be about 3" in height measured from the tip of the hook to the point where the front portion 9 meets the surface of the cross member.

The cross member should be about ½" in thickness, i.e. the cross section of the cross member. Such dimensions are thought to enable the tool to fit into the bore and be used to best advantage.

I claim:

1. A wheel seal removal tool for insertion into the bore area of a wheel in order to remove the wheel seal, the tool comprising: a lever having a hand grip at one end and an upraised hook portion at the other end, a cross member in connection with said lever, said cross member having a rear edge and a front face that are perpendicular to said lever, said cross member having a leading edge extending from said front face to said rear edge so as to form tip portions where said leading edge approaches said rear edge, said tip portions narrowing to about ⅜" in width, said cross member of size adapted to fit within the bore area of the wheel so that said tip portions fit against the wheel, said hook portion having an upper edge extending from said front face in the direction of said handgrip, said hook portion having a notched portion so as to form a rear face and a bottom face said rear face and said bottom face meeting to form a right angle, said notched portion behind said upper edge so that said notched portion will be able to fit between said wheel seal and said wheel when said tip portions are placed in connection with said wheel.

2. The apparatus of claim 1 where said upraised hook portion is about 3" in height.

* * * * *